US009819612B2

(12) United States Patent
Budhia et al.

(10) Patent No.: US 9,819,612 B2
(45) Date of Patent: *Nov. 14, 2017

(54) MULTI-HOMING IN AN EXTENDED BRIDGE

(71) Applicant: AVAGO TECHNOLOGIES GENERAL IP (SINGAPORE) PTE. LTD., Singapore (SG)

(72) Inventors: Rupa Budhia, San Jose, CA (US); Biju Ravindranatha Babu, San Jose, CA (US); Mohan Venkatachar Kalkunte, Saratoga, CA (US); Puneet Agarwal, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 175 days.

This patent is subject to a terminal disclaimer.

(21) Appl. No.: 14/731,827

(22) Filed: Jun. 5, 2015

(65) Prior Publication Data

US 2015/0271105 A1 Sep. 24, 2015

Related U.S. Application Data

(63) Continuation of application No. 13/839,185, filed on Mar. 15, 2013, now Pat. No. 9,077,650.

(Continued)

(51) Int. Cl.
*H04L 12/937* (2013.01)
*H04L 29/06* (2006.01)
(Continued)

(52) U.S. Cl.
CPC .......... *H04L 49/253* (2013.01); *H04L 12/462* (2013.01); *H04L 12/4625* (2013.01);
(Continued)

(58) Field of Classification Search
None
See application file for complete search history.

(56) References Cited

U.S. PATENT DOCUMENTS

| 7,697,525 B2 | 4/2010 | Zelig et al. |
| 9,077,650 B2 * | 7/2015 | Budhia ............... H04L 49/253 |

(Continued)

FOREIGN PATENT DOCUMENTS

| CN | 101170512 A | 4/2008 |
| CN | 101330370 A | 12/2008 |
| KR | 2009-0101270 | 9/2009 |

OTHER PUBLICATIONS

Chinese Office Action dated Dec. 30, 2015 in corresponding Chinese Application No. 201310215584.X (12 pages).

(Continued)

*Primary Examiner* — Charles C Jiang
*Assistant Examiner* — George Atkins, Jr.
(74) *Attorney, Agent, or Firm* — Oblon, McClelland, Maier & Neustadt, L.L.P.

(57) ABSTRACT

Disclosed are various embodiments for multi-homing in an extended bridge, including both multi-homing of port extenders and multi-homing of end stations. In various embodiments, a controlling bridge device receives a packet via an ingress virtual port and determines a destination virtual port link aggregation group based at least in part on a destination media access control (MAC) address of an end station in the packet. The controlling bridge device selects one of multiple egress virtual ports of the destination virtual port link aggregation group. The end station of the extended bridge is reachable through any of the egress virtual ports of the destination virtual port link aggregation group. The controlling bridge device forwards the packet through the selected egress virtual port, and the forwarded packet (Continued)

includes an identifier of a destination virtual port to which the end station is connected.

20 Claims, 11 Drawing Sheets

Related U.S. Application Data

(60) Provisional application No. 61/653,858, filed on May 31, 2012.

(51) Int. Cl.
*H04L 12/46* (2006.01)
*H04L 12/709* (2013.01)
*H04L 12/741* (2013.01)
*H04L 12/713* (2013.01)
*H04L 12/721* (2013.01)
*H04L 12/707* (2013.01)

(52) U.S. Cl.
CPC ............ *H04L 45/24* (2013.01); *H04L 45/245* (2013.01); *H04L 45/586* (2013.01); *H04L 45/66* (2013.01); *H04L 45/74* (2013.01); *H04L 65/4076* (2013.01); *Y02B 60/33* (2013.01)

(56) References Cited

U.S. PATENT DOCUMENTS

| | | | |
|---|---|---|---|
| 2005/0198371 A1* | 9/2005 | Smith | H04L 45/02 709/238 |
| 2008/0123528 A1 | 5/2008 | Wyatt | |
| 2010/0157844 A1 | 6/2010 | Casey et al. | |
| 2012/0243411 A1* | 9/2012 | Wyatt | H04Q 3/68 370/235 |
| 2012/0307828 A1* | 12/2012 | Agarwal | H04L 49/70 370/392 |

OTHER PUBLICATIONS

Draft Standard for Local and Metropolitan Area Networks—Virtual Bridged Local Area Networks—Bridge Port Extension, IEEE P802.1 BR/D3.3, Feb. 20, 2012, (146 pages).
Office Action dated Jul. 24, 2014 in Korean Patent Application No. 10-2013-0062444 (5 pages).
Virtual Bridge Port Extension (IEEE P802.1Qbh), René Raeber, XP055078034 (Sep. 2010) (21 pages).
Taiwanese Office Action issued Mar. 31, 2015 in Taiwanese Patent Application No. 102115602 (8 pages).
Raeber, Rene: "Bridge Port Extension" (IEEE 1-15 P802.1Qbh), Sep. 9, 2010, pp. 1-21, XP055078034.

* cited by examiner

MULTI-HOMING IN AN EXTENDED BRIDGE

CROSS REFERENCE TO RELATED APPLICATIONS

This application is a Continuation of U.S. application Ser. No. 13/839,185, filed Mar. 15, 2013, which claims priority to, and the benefit of, U.S. Provisional Patent Application entitled "MULTI-HOMING IN AN EXTENDED BRIDGE," having Ser. No. 61/653,858, filed on May 31, 2012, which is incorporated by reference herein in its entirety.

BACKGROUND

A network bridge is a Layer 2 device that connects two or more network segments together, thereby creating an aggregate network. It may be desirable to link network segments to the aggregated network that cannot be connected together directly. A port extender allows a network segment to be added to the aggregate network. A port extender attaches to a media access control (MAC) port of a bridge and provides additional MAC ports that are logically ports of the bridge to which it is attached, which may be referred to as a controlling bridge.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing multi-homing support in an extended bridge including a controlling bridge and port extenders. This multi-homing support may include multi-homing of port extenders into multiple other port extenders with multiple links active. This multi-homing support may also include multi-homing of end stations into multiple port extenders with multiple links active. When multi-homing is supported for port extenders and end systems, performance is enhanced through utilization of multiple links. Also, availability is increased through handling failover of port extenders and links using virtual port link aggregation group failover approaches.

Figure 1:
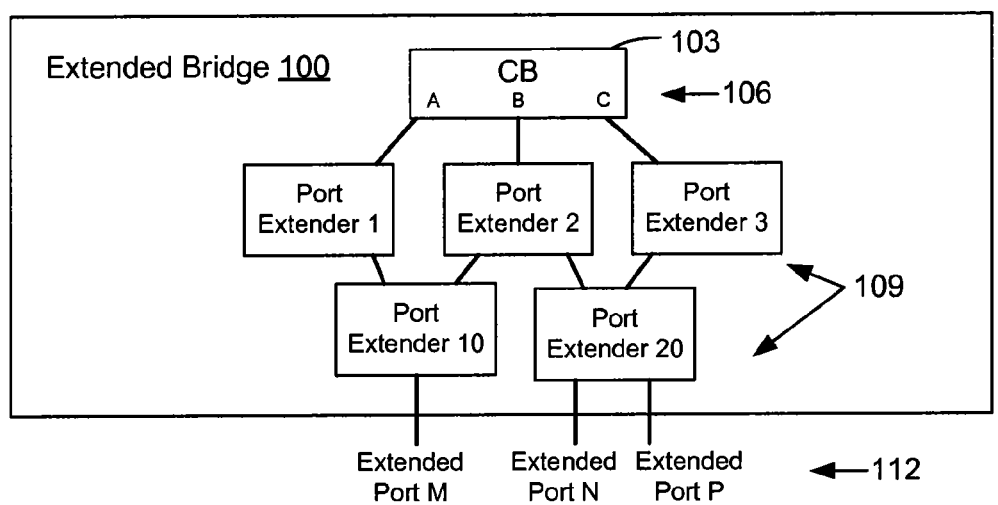
FIG. 1 shows an exemplary extended bridge according to various embodiments of the present disclosure.

FIG. 1 shows an exemplary extended bridge 100 according to various embodiments of the present disclosure. The extended bridge 100 includes a controlling bridge 103 having one or more actual ports 106 and a network of port extenders 109 feeding into actual ports 106 of the controlling bridge (CB) 103. The port extenders 109 encapsulate Layer-2 traffic to and from the controlling bridge 103 so as to provide extended ports 112 for the extended bridge 100. The port extenders 109 may be stacked so that one port extender 109 feeds into another port extender 109. The extended bridge 100 employs a single name space across all of the extended ports 112.

In the non-limiting example of FIG. 1, five port extenders 109 are shown, which are labeled port extender 1, port extender 2, port extender 3, port extender 10, and port extender 20. Port extenders 1, 2, and 3 each feed into respective actual ports 106 (labeled A, B, and C) of the controlling bridge 103. Port extender 10 is multi-homed into port extender 1 and port extender 2, and port extender 20 is multi-homed into port extender 2 and port extender 3. Port extender 10 provides one extended port 112 (labeled extended port M), and port extender 20 provides two extended ports 112 (labeled extended port N and extended port P).

In one embodiment, the extended bridge 100 employs a single extended channel identifier (ECID) namespace across all ports. Each extended port 112 of the extended bridge 100 may be assigned an ECID that is unique across the entire extended bridge 100. An extended port 112 may have hierarchically organized ECIDs, and packets may be sent from the same extended port 112 that have different ECIDs. Multicast distribution trees that are rooted at the controlling bridge 103 may be constructed across the entire topology of the extended bridge 100. One or more such loop-free trees may be constructed and maintained by the controlling bridge 103.

Figure 2:
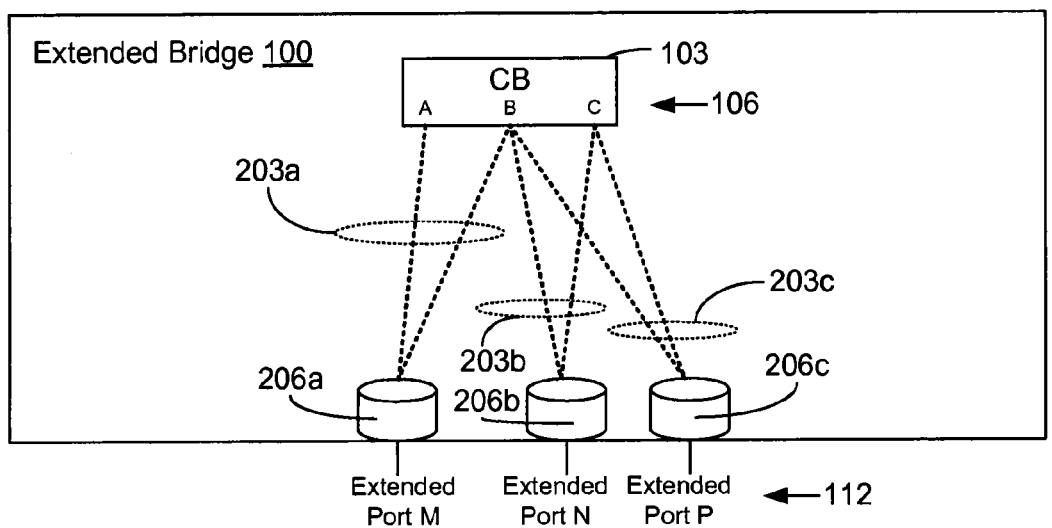
FIG. 2 shows a logical view of the exemplary extended bridge of FIG. 1 according to various embodiments of the present disclosure.

FIG. 2 shows a logical view of the exemplary extended bridge 100 (FIG. 1) according to various embodiments of the present disclosure. In this logical view, the network of port extenders 109 (FIG. 1) are replaced with virtual port link aggregation groups (VPLAGs) 203a, 203b, and 203c. At the controlling bridge 103, each extended port 112 may be represented as a virtual port. Due to multi-homing of port extenders 109 (FIG. 1), there may be multiple paths from the controlling bridge 103 to the extended port 112. The multiple paths may be represented in the controlling bridge 103 as a VPLAG 203. Each member of the VPLAG 203 may be an association between a virtual port and a path.

As a non-limiting example, there are two paths to extended port M, which corresponds to virtual port (VP) 206a; one path is through the actual port A and the other path is through the actual port B of the controlling bridge 103. Therefore, extended port M is represented in the controlling bridge 103 as a VPLAG 203a having two members: (VP 206a, actual port A) and (VP 206a, actual port B). The VP 206a may be associated with an exemplary ECID attribute of "450." Similarly, the extended port N, corresponding to VP 206b, is represented in the controlling bridge 103 as a VPLAG 203b having two members: (VP 206b, actual port B) and (VP 206b, actual port C). The VP 206b may be associated with an exemplary ECID attribute of "455." Likewise, the extended port P, corresponding to VP 206c, is represented in the controlling bridge 103 as a VPLAG 203c having two members: (VP 206c, actual port B) and (VP 206c, actual port C). The VP 206c may be associated with an exemplary ECID attribute of "510." The ECID attributes discussed herein are provided merely as an example to show that ECID attributes may be associated with VPLAGs 203 and unique within the extended bridge 100.

Figure 2A:
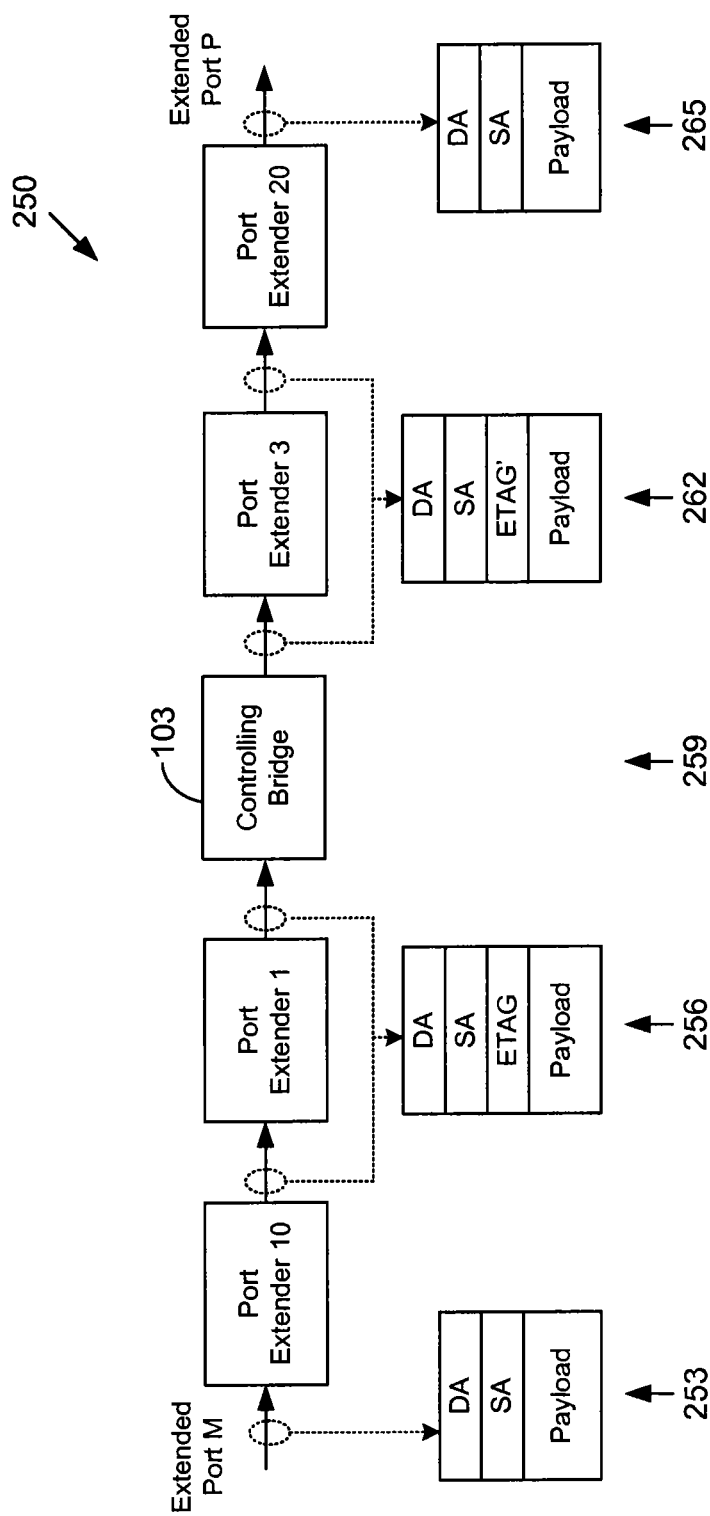
FIG. 2A is a diagram depicting an exemplary packet flow within the exemplary extended bridge of FIG. 1 according to various embodiments of the present disclosure.

FIG. 2A is a diagram depicting an exemplary packet flow 250 within the extended bridge 100 (FIG. 1). In particular, the diagram depicts a packet flow 250 from extended port M (FIG. 1) to extended port P (FIG. 1) of the extended bridge 100. A unicast flow will first be discussed.

At stage 253, a packet is received at extended port M having a particular destination address (DA), a particular source address (SA), and a payload. The packet is processed by port extender 10 (FIG. 1). An extended-tag (ETAG) field is added to the packet by the port extender 10. In this example, the ETAG indicates a destination ECID of "450," corresponding to the ECID of the virtual port 206a (FIG. 2), and a source ECID of "0." It is noted that different ECIDs may be employed in the ETAG field for the upstream and downstream directions. Uplinks into port extender 1 (FIG. 1) and port extender 2 (FIG. 1) appear as a VPLAG to the port extender 10. The port extender 10 selects one of the links (either to port extender 1 or port extender 2) according to LAG resolution. In this example, the packet is sent to port extender 1. Port extender 2 may be selected in other examples. At stage 256, the port extender 1 sends the packet out on the single uplink port to the actual port A (FIG. 1) of the controlling bridge 103 (FIG. 1). No forwarding lookups or learning is performed at this point in this example.

At stage 259, the controlling bridge 103 processes the packet. In the controlling bridge 103, the combination of the ingress port A with the destination ECID of "450" is mapped into a source VPLAG of VPLAG 203a (FIG. 2). Forwarding lookups are performed for the packet. In this example, the destination will be VPLAG 203c (FIG. 2). Source removal checks are performed next. In this case, the packet is not dropped since the source VPLAG and the destination VPLAG are not equal. The association between the source media access control (MAC) address SA and the source VPLAG 203a is learned. VPLAG 203c is then resolved. In this example flow, (VP 206c (FIG. 2), actual port C) is selected, but (VP 206c, actual port B) may be selected in other examples. The updated ETAG is shown as "ETAG'." Since this is a unicast packet, the downstream ETAG has a source ECID attribute of "0" and a destination ECID attribute of "510." "510" is the ECID attribute corresponding to the virtual port 206c. The packet is then sent out of the controlling bridge 103 via the actual port C (FIG. 1).

At stage 262, the port extender 3 (FIG. 1) receives the packet. The port extender 3 performs a forwarding lookup on the ETAG destination ECID attribute of "510" and sends out the packet to the port extender 20 (FIG. 1). At stage 265, the port extender 20 performs a forwarding lookup on the ETAG destination ECID attribute of "510" and forwards the packet out of the extended port P.

A multicast flow example will now be discussed. The multicast flow has an upstream flow to the controlling bridge 103 that is the same as the unicast flow previously described. If the forwarding lookup result is a multicast group, the packet is sent out the appropriate set of actual ports 106 (FIG. 1) of the controlling bridge 103. Since the namespace of the incoming and outgoing ports is the same, the incoming ETAG destination ECID is retained as the ETAG source ECID in the downstream direction. With the situation of FIG. 2A, the ETAG source ECID would be set to "450" in the downstream direction instead of 0 for a multicast flow. At the port extenders 109 (FIG. 1), source removal is performed by comparing the ECID value of the extended port 112 (FIG. 1) with the ETAG source ECID. Since loop-free trees are constructed across the entire extended bridge 100, only one copy of the packet may be forwarded out of each extended port 112.

Figure 3:
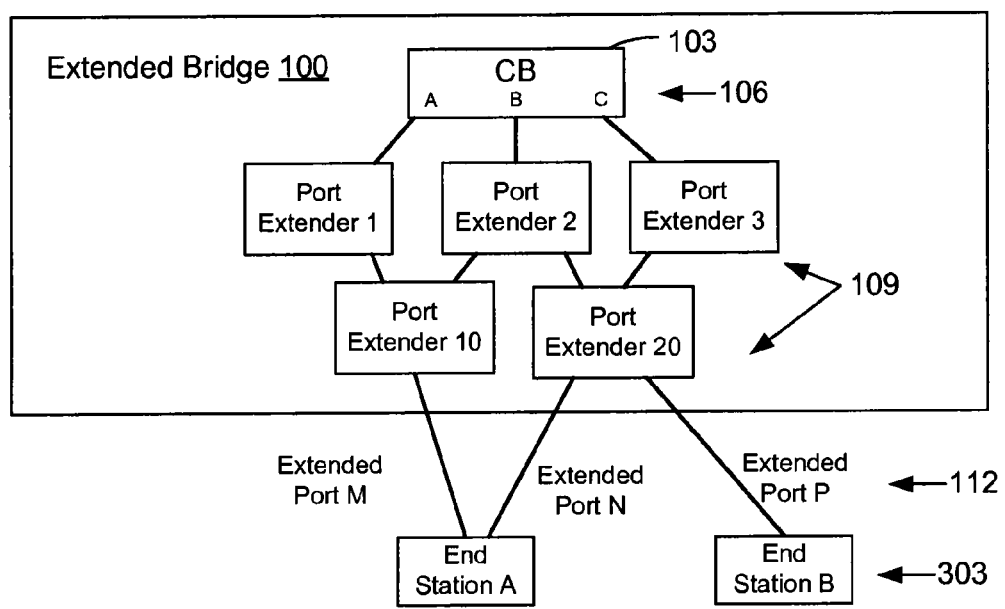
FIG. 3 shows the exemplary extended bridge of FIG. 1 with multi-homing of end stations according to various embodiments of the present disclosure.

FIG. 3 shows an exemplary extended bridge 100 (FIG. 1) with multi-homing of end stations 303 according to various embodiments of the present disclosure. Two end stations 303 are connected to the extended bridge 100 in this example: end station A and end station B. End station A is multi-homed into the extended bridge 100 via extended port M of port extender 10 and extended port N of port extender 20. This multi-homing is represented as a LAG of extended ports 112. This LAG may be assigned a unique ECID. End station B is connected to the extended bridge 100 via extended port P of port extender 20.

Figure 4:
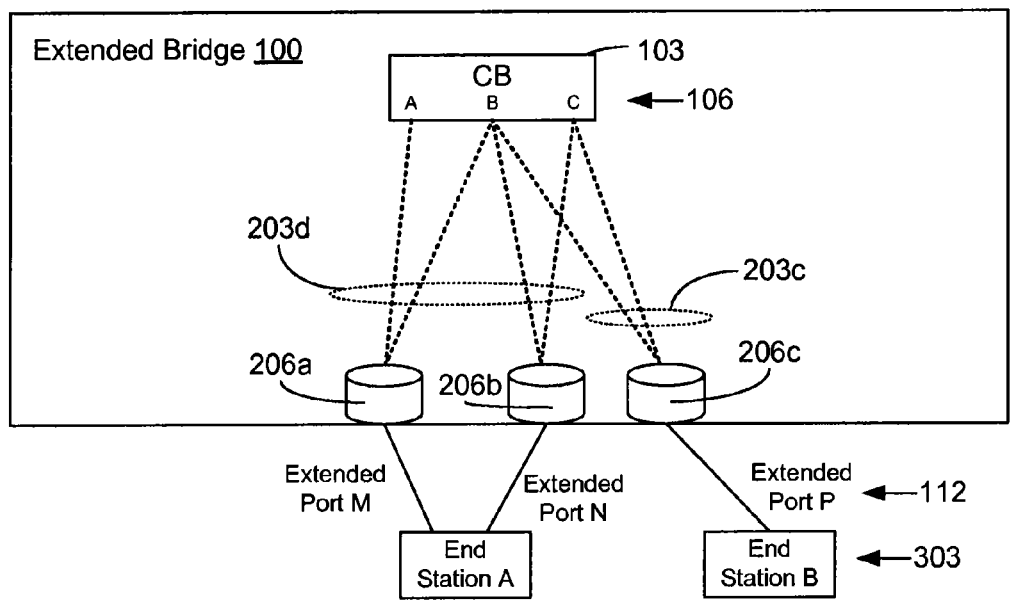
FIG. 4 shows a logical view of the exemplary extended bridge of FIG. 1 with multi-homing of end stations according to various embodiments of the present disclosure.

FIG. 4 shows a logical view of the exemplary extended bridge 100 (FIG. 1) with multi-homing of end stations 303 (FIG. 3) according to various embodiments of the present disclosure. In this logical view, the LAG of extended ports is represented as a new VPLAG 203d that includes all members of the individual VPLAGs for each of the extended ports 112, namely VPLAGs 203a and 203b (FIG. 2). In particular, the VPLAG 203d includes the associations (VP 206a, actual port A), (VP 206a actual port B), (VP 206b, actual port B), and (VP 206b, actual port C).

Port extender 10 is configured so that extended port M has an ECID of "1100" for the LAG in this non-limiting example. This is the ECID value that is used in the ETAG for upstream traffic. It is also used for source knockout for multicast downstream traffic as described with reference to FIG. 2A. In addition, the downstream forwarding table in the port extender 10 will have an entry for ECID="450" in this non-limiting example. The port extender 10 sends unicast packets with destination ECID of "450" out of extended port M.

Similarly, port extender 20 is configured so that extended port N has an ECID of "1100" for the LAG in this non-limiting example. In addition, the downstream forwarding table in the port extender 20 will have an entry for ECID="455" in this non-limiting example. The port extender 20 sends unicast packets with destination ECID of "455" out of extended port N.

Figure 5A:
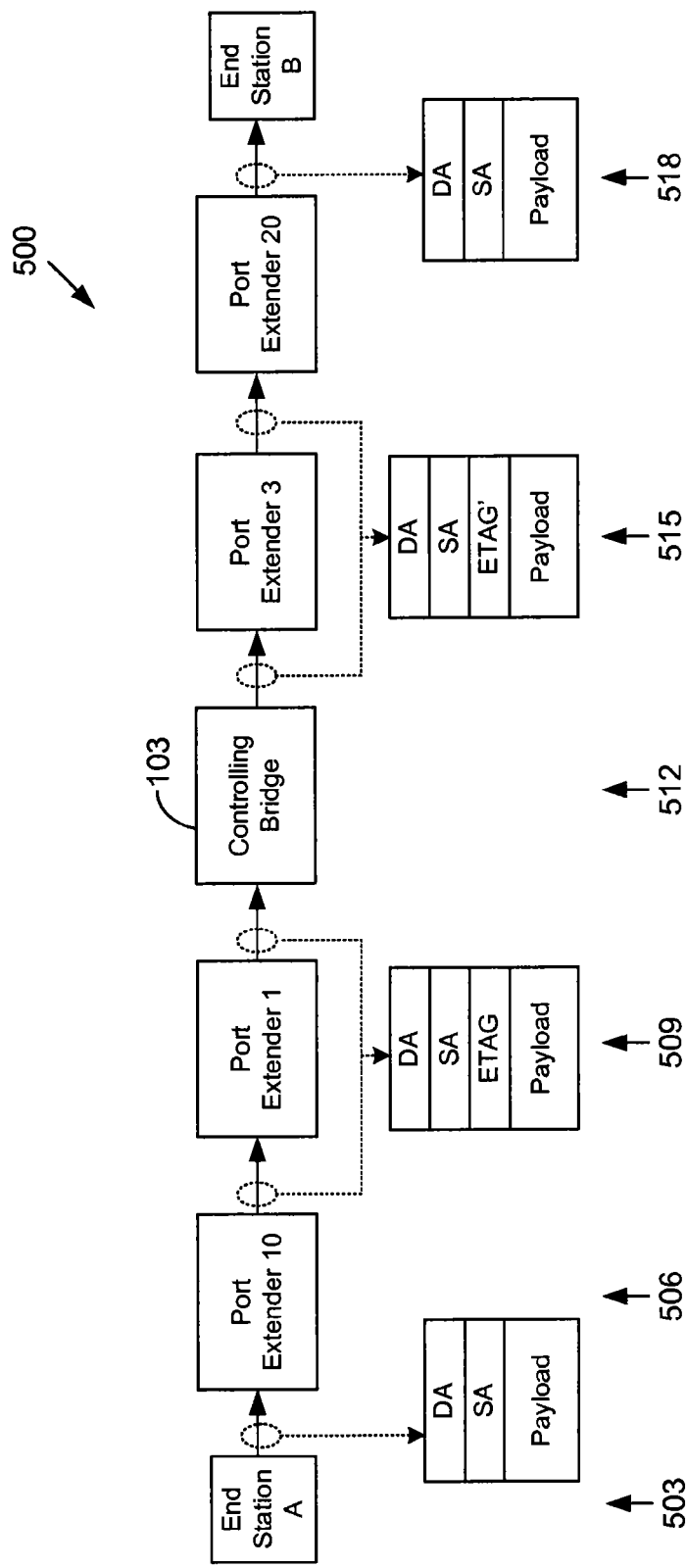
FIG. 5A is a diagram depicting an exemplary packet flow within the exemplary extended bridge of FIG. 1 according to various embodiments of the present disclosure.

FIG. 5A is a diagram depicting an exemplary packet flow 500 within the extended bridge 100 (FIG. 1). In particular, the diagram depicts a packet flow 500 from end station A (FIG. 3) to end station B (FIG. 3) of the extended bridge 100 by way of the controlling bridge 103.

At stage 503, the end station A generates a packet having a source address, a destination address, and a payload. The end station A in this example chooses to forward the packet through port extender 10 (FIG. 3), but port extender 20 (FIG. 3) may be chosen as end station A is connected to both port extenders 10 and 20. At stage 506, the port extender 10 receives the packet from end station A and adds an ETAG ECID of "1100" corresponding to the VPLAG 203*d* (FIG. 4). Uplinks into port extender 1 (FIG. 3) and port extender 2 (FIG. 3) may appear as a LAG to port extender 10. Port extender 10 selects one of the links via LAG resolution. In this example, the packet is sent to port extender 1.

At stage 509, port extender 1 sends the packet out on the uplink port, which is connected to the controlling bridge 103. No forwarding lookups or learning is performed. At stage 512, the controlling bridge 103 maps (ingress port A, ETAG ECID="1100") to the source VPLAG 203*d*. Forwarding lookups are performed for the packet. In this example, the destination is VPLAG 203*c* (FIG. 4). Source removal checks are performed next. In this case, the packet is not dropped since the source VPLAG and destination VPLAG are not the same. The association between the source MAC address and the source VPLAG 203*d* is learned. VPLAG 203*c* is then resolved. In this example flow, the association (VP 206*c* (FIG. 4), actual port C) is selected, and the packet is sent via actual port C (FIG. 3). The ETAG destination ECID="510" is set as indicated in "ETAG'."

At stage 515, the port extender 3 (FIG. 3) receives the packet. Port extender 3 performs a forwarding lookup on ETAG ECID="510." As a result of the lookup, the port extender 3 forwards the packet to port extender 20. At stage 518, the port extender 20 performs a forwarding lookup on ETAG ECID="510" to forward the packet to end station B.

Figure 5B:
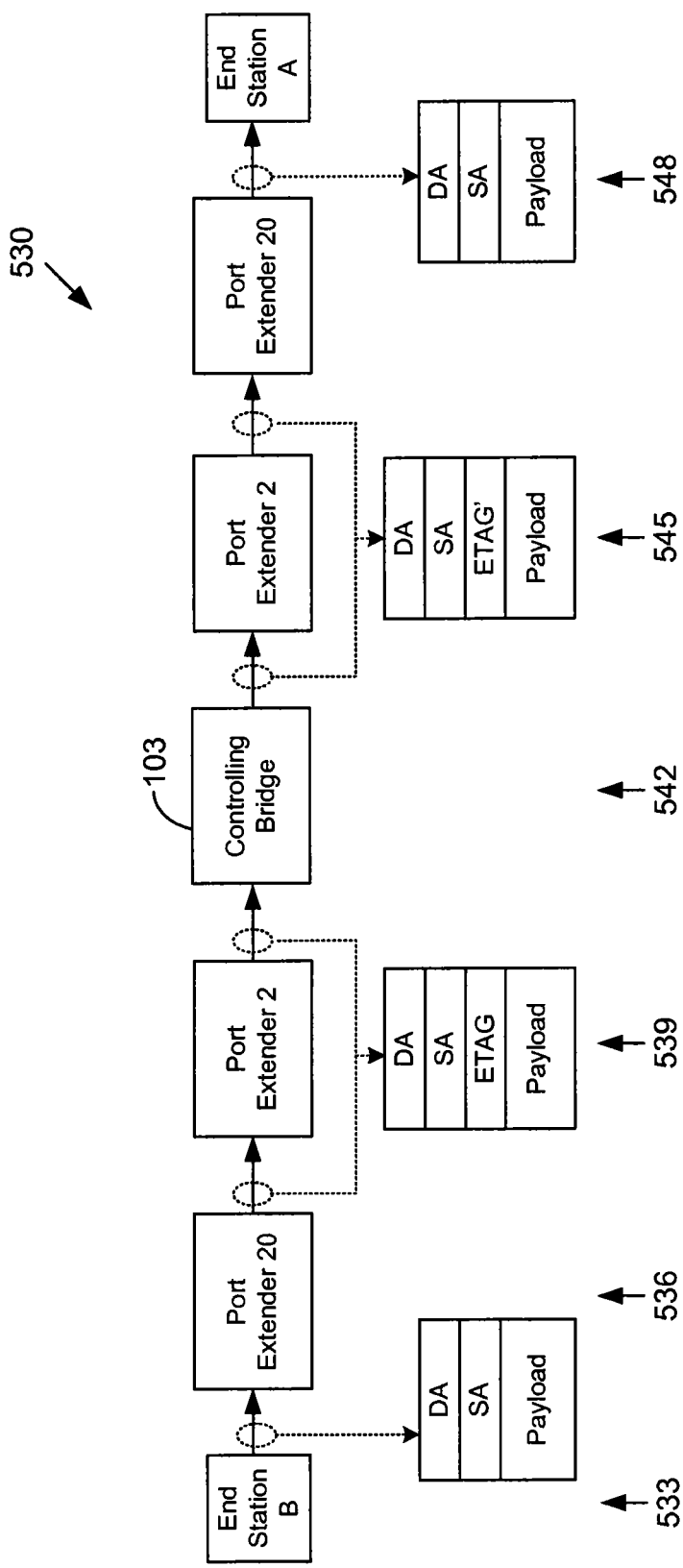
FIG. 5B is a diagram depicting an exemplary packet flow within the exemplary extended bridge of FIG. 1 according to various embodiments of the present disclosure.

FIG. 5B is a diagram depicting an exemplary packet flow 530 within the extended bridge 100 (FIG. 1). In particular, the diagram depicts a packet flow 530 from end station B (FIG. 3) to end station A (FIG. 3) of the extended bridge 100 by way of the controlling bridge 103.

At stage 533, the end station B generates a packet having a source address, a destination address, and a payload. The end station B forwards the packet via port extender 20. At stage 536, the port extender 20 receives the packet from end station B and adds an ETAG ECID of "510" corresponding to the VP 206*c* (FIG. 4). Uplinks into port extender 2 (FIG. 3) and port extender 3 (FIG. 3) may appear as a LAG to port extender 20. Port extender 20 selects one of the links via LAG resolution. In this example, the packet is sent to port extender 2.

At stage 539, port extender 2 sends the packet out on the uplink port, which is connected to the controlling bridge 103. No forwarding lookups or learning is performed. At stage 542, the controlling bridge 103 maps (ingress port B, ETAG ECID="510") to source VPLAG 203*c* (FIG. 4). Forwarding lookups are performed for the packet. In this example, the destination is VPLAG 203*d* (FIG. 4). Source removal checks are performed next. In this case, the packet is not dropped since the source VPLAG and destination VPLAG are not the same. The association between the source MAC address and the source VPLAG 203*c* is learned. VPLAG 203*d* is then resolved. In this example flow, the association (VP 203*b*, actual port B) is selected, and the packet is sent via actual port B (FIG. 3). ETAG ECID="455" is set in "ETAG'," and this ECID value is also associated with VP 203*b*.

At stage 545, the port extender 2 receives the packet. Port extender 2 performs a forwarding lookup on ETAG ECID="455." As a result of the lookup, the port extender 2 forwards the packet to port extender 20. At stage 548, the port extender 20 performs a forwarding lookup on ETAG ECID="455" to forward the packet to end station A. It is noted that traffic up to the controlling bridge 103 from end station A uses a source ECID of 1100. However, traffic to end station A uses a destination ECID of 455. In another example, the traffic to end station A may use a destination ECID of 450. It is noted that the source ECID differs from the destination ECID.

Figure 5C:
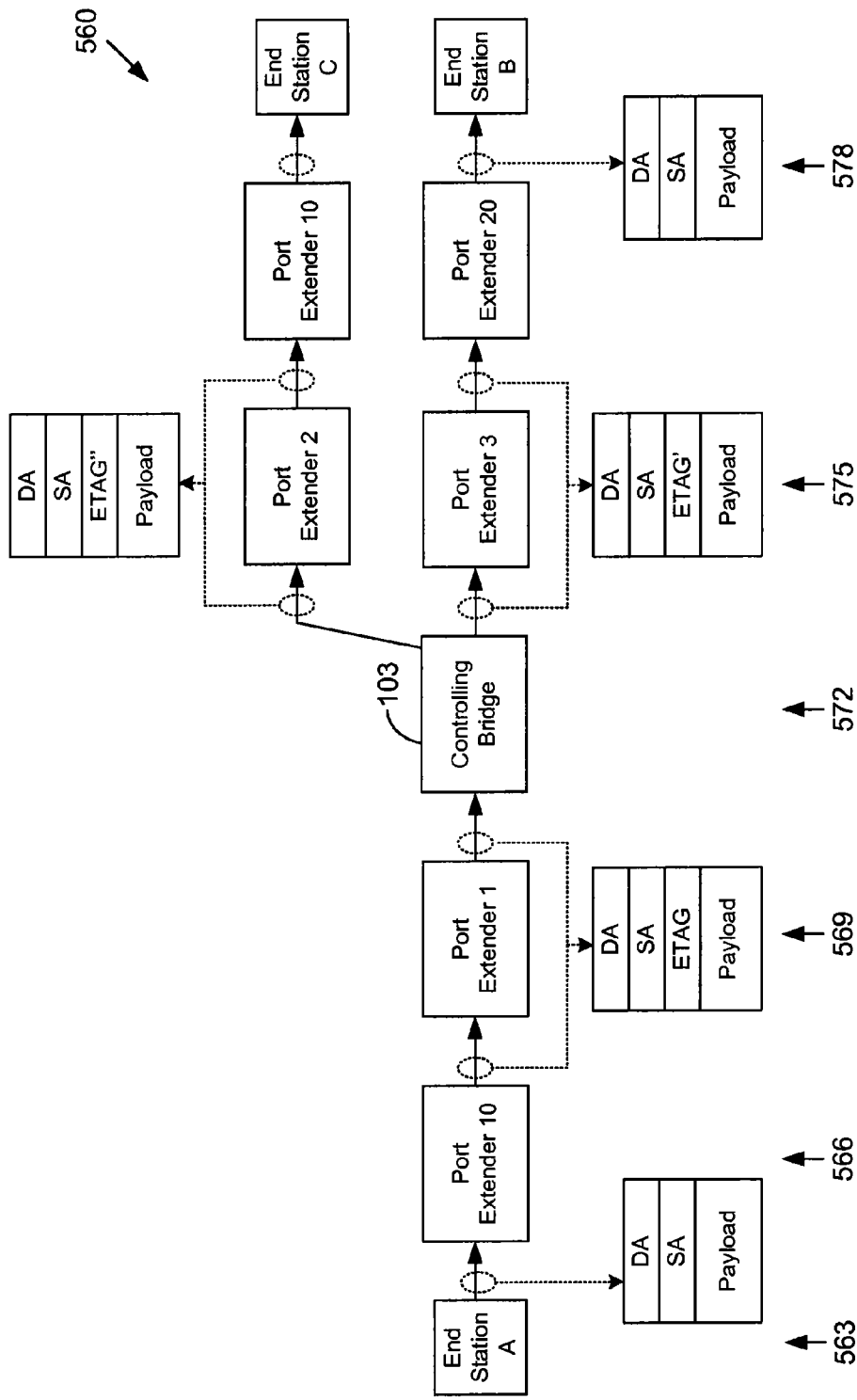
FIG. 5C is a diagram depicting an exemplary multicast packet flow within the exemplary extended bridge of FIG. 1 according to various embodiments of the present disclosure.

FIG. 5C is a diagram depicting an exemplary multicast packet flow 560 within the extended bridge 100 (FIG. 1). In particular, the diagram depicts a multicast packet flow 560 from end station A (FIG. 3) to end station B (FIG. 3) and another end station C of the extended bridge 100 by way of the controlling bridge 103. The end station C is coupled to port extender 10 (FIG. 3).

At stage 563, the end station A generates a packet having a source address, a multicast destination address, and a payload. The end station A in this example chooses to forward the packet through port extender 10, but port extender 20 (FIG. 3) may be chosen as end station A is connected to both port extenders 10 and 20. At stage 566, the port extender 10 receives the packet from end station A and adds an exemplary ETAG ECID of "1100" corresponding to the VPLAG 203*d* (FIG. 4). Uplinks into port extender 1 (FIG. 3) and port extender 2 (FIG. 3) may appear as a LAG to port extender 10. Port extender 10 selects one of the links via LAG resolution. In this example, the packet is sent to port extender 1.

At stage 569, port extender 1 sends the packet out on the uplink port, which is connected to the controlling bridge 103. No forwarding lookups or learning is performed. At stage 572, the controlling bridge 103 in this example maps (ingress port A, ETAG destination ECID="1100") to source VPLAG 203*d*. Forwarding lookups are performed for the packet. In this example, the destination is a multicast group, with copies being forwarded out of actual port B (FIG. 3) and actual port C (FIG. 3) with the ETAG destination ECID for both ETAG' and ETAG" being set to an exemplary multicast ECID of "treeVID1." Since this is a multicast packet going out on ports with the same namespace as the incoming port, the incoming ETAG ECID value of "1100" is retained as the outgoing ETAG source ECID for both ETAG' and ETAG" as shown.

In the downstream direction, it is assumed that a loop-free tree is constructed across the namespace. Forwarding tables for the multicast ECID at port extender 2, port extender 3, port extender 10, and port extender 20 are based on the loop-free tree. Source removal happens at each of the extended ports 112 (FIG. 3) by comparing the ETAG source ECID with the configured ECID for each extended port 112. The controlling bridge 103 forwards the packet to both port extender 2 and port extender 3.

At stage 575, the port extender 2 forwards the packet to port extender 10, and the port extender 3 forwards the packet to port extender 20. At port extender 10 or port extender 20, if the packet attempts to go back to end station A, the incoming ETAG source ECID of "1100" will match the configured ECID ("1100") for the extended ports M and N. Therefore, no copies will go back to end station A. At stage 578, the port extender 10 forwards the packet to end station C, and the port extender 20 forwards the packet to end station B.

Figure 6A:
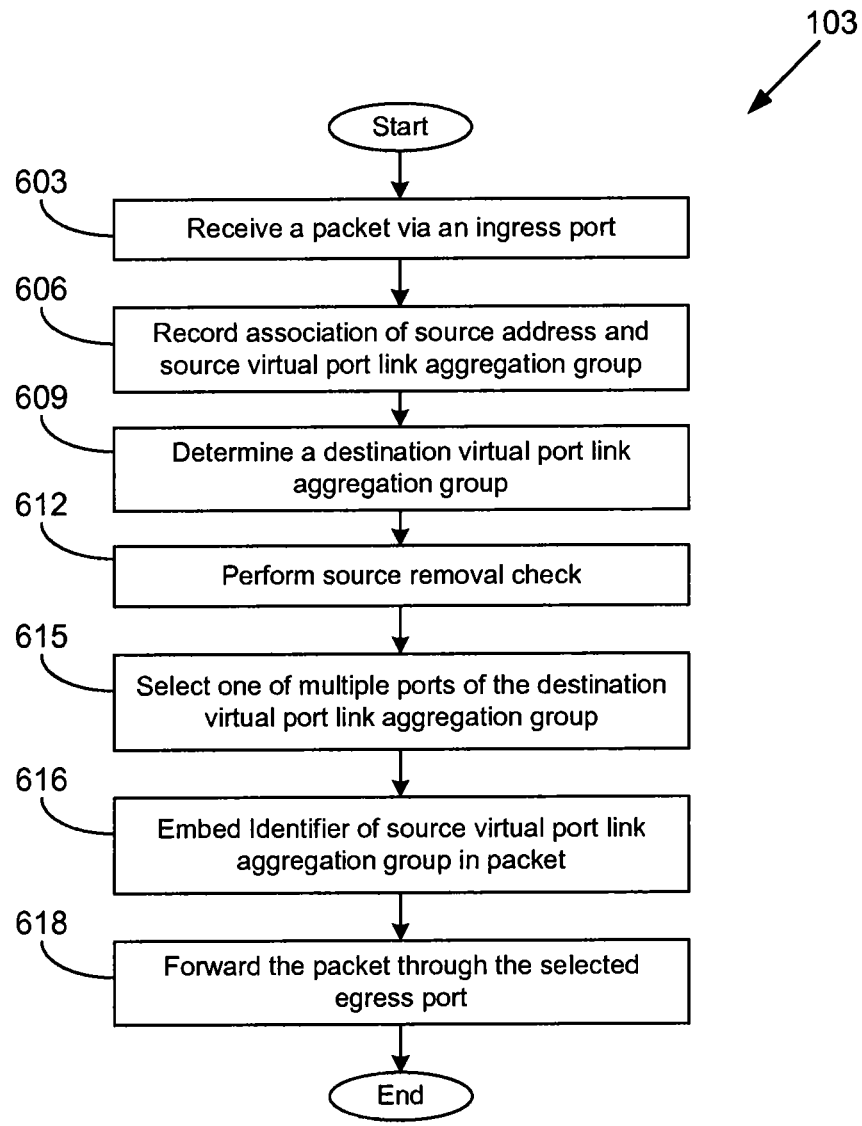
FIG. 6A is a flowchart that provides one example of the operation of a portion of an exemplary controlling bridge within the exemplary extended bridge of FIG. 1 according to various embodiments of the present disclosure.

FIG. 6A is a flowchart that provides one example of the operation of a portion of the controlling bridge 103 in an extended bridge 100 (FIG. 1) according to various embodiments. It is understood that the flowchart of FIG. 6A provides merely an example of the many different types of functional arrangements that may be employed to implement the operation of the portion of the controlling bridge 103 as described herein. As an alternative, the flowchart of FIG. 6A may be viewed as depicting an example of steps of a method implemented in the controlling bridge 103 according to one or more embodiments.

Beginning with reference numeral 603, the controlling bridge 103 receives a packet via an ingress port. The received packet may include an identifier of a source VPLAG 203 (FIG. 2). In some cases, the received packet may include an identifier of a source virtual port 206 (FIG. 2) of a source port extender 109 (FIG. 1). In some cases, the packet may be received from an intermediate port extender 109, and the controlling bridge 103 may receive other packets from that intermediate port extender 109 that have an identifier of a different source virtual port 206 of a different source port extender 109.

At reference numeral 606, the controlling bridge 103 records an association of the source MAC address and the source VPLAG 203 associated with the packet. At reference numeral 609, the controlling bridge 103 determines a destination VPLAG 203. The destination VPLAG 203 may be determined based at least in part on a destination MAC address of an end station 303 (FIG. 3) in the packet. At reference numeral 612, the controlling bridge 103 performs a source removal check. For example, the controlling bridge 103 may drop the packet when the source VPLAG 203 is the destination VPLAG 203.

At reference numeral 615, the controlling bridge 103 selects one of multiple egress ports of the destination VPLAG 203 determined for the packet. The end station 303 may be reachable through any of the egress ports of the destination VPLAG 203. Thus, for other packets, a different egress port of the destination VPLAG 203 may be selected. At reference numeral 616, the controlling bridge 103 embeds the identifier of the source VPLAG 203 in the packet when the destination MAC address corresponds to a multicast group. At reference numeral 618, the controlling bridge 103 forwards the packet through the selected egress port. The forwarded packet may include an identifier of a destination virtual port 206 to which the end station 303 is connected.

In some cases, the packet may be forwarded to a destination port extender 109 that has the destination virtual port 206. The end station 303 may be connected to the destination port extender 109 and to other port extenders 109 of the extended bridge 100. In other cases, the packet may be forwarded to an intermediate port extender 109 that is configured to forward the packet to the destination port extender 109 based at least in part on the identifier of the destination virtual port 206. Thereafter, the portion of the controlling bridge 103 ends.

Figure 6B:
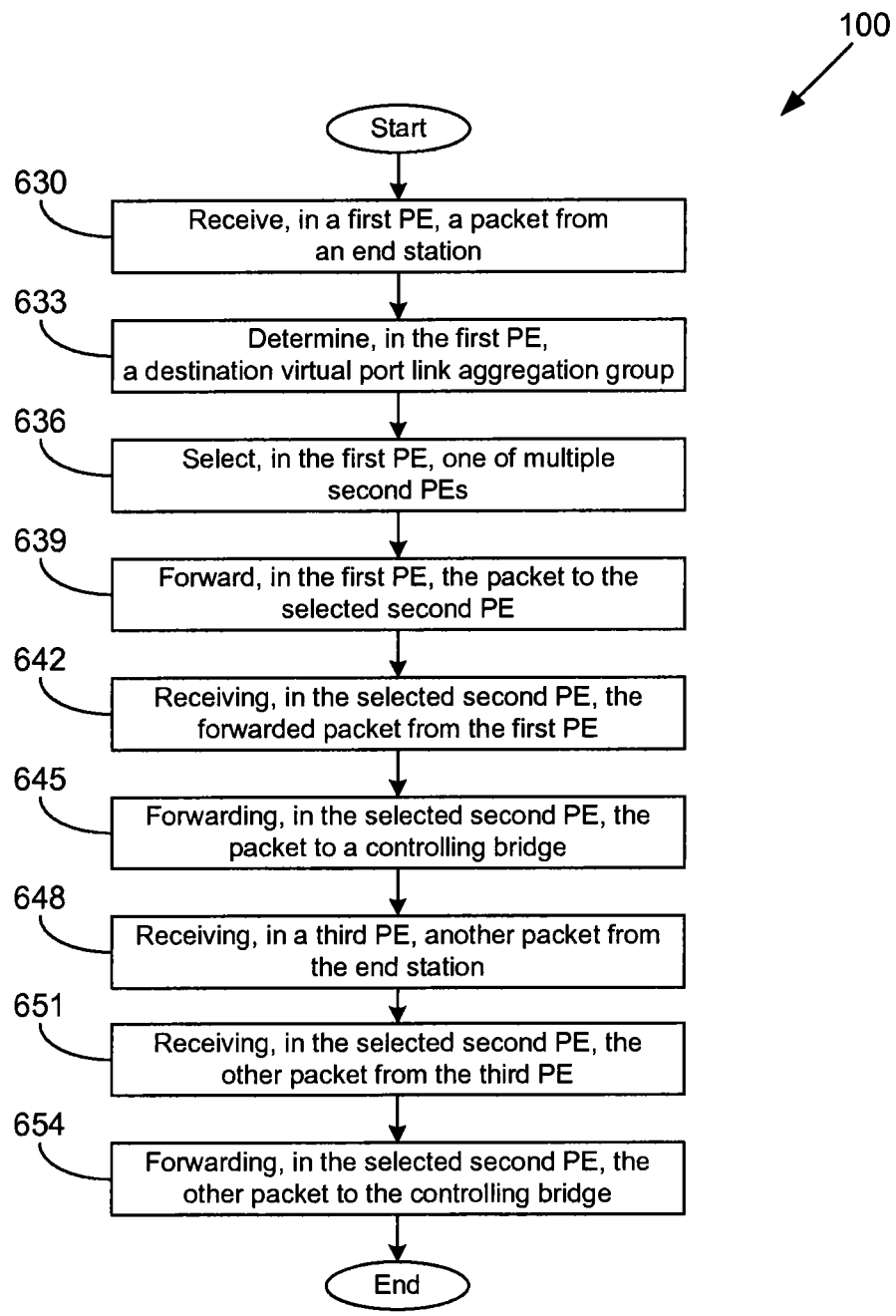
FIG. 6B is a flowchart that provides one example of the operation of a portion of exemplary port extenders within the exemplary extended bridge of FIG. 1 according to various embodiments of the present disclosure.

FIG. 6B is a flowchart that provides one example of the operation of a portion of various port extenders 109 (FIG. 1) in an extended bridge 100 according to various embodiments. It is understood that the flowchart of FIG. 6B provides merely an example of the many different types of functional arrangements that may be employed to implement the operation of the portion of the extended bridge 100 as described herein. As an alternative, the flowchart of FIG. 6B may be viewed as depicting an example of steps of a method implemented in the extended bridge 100 according to one or more embodiments.

Beginning with reference numeral 630, a first port extender 109 receives a packet from an end station 303 (FIG. 3). At reference numeral 633, the first port extender 109 determines a destination VPLAG 203 (FIG. 2) based at least in part on a destination MAC address in the packet. At reference numeral 636, the first port extender 109 selects one of multiple second port extenders 109 according to the destination VPLAG 203. At reference numeral 639, the first port extender 109 forwards the packet to the selected second port extender 109. The forwarded packet includes an identifier of a destination virtual port 206 (FIG. 2).

At reference numeral 642, the selected second port extender 109 receives the forwarded packet from the first port extender 109. At reference numeral 645, the selected second port extender 109 forwards the packet to a controlling bridge 103 (FIG. 1) of the extended bridge 100.

At reference numeral 648, a third port extender 109 receives another packet from the end station 303. At reference numeral 651, the selected second port extender 109 receives the other packet from the third port extender 109. At reference numeral 654, the selected second port extender 109 forwards the other packet to the controlling bridge 103. Thereafter, the portion of the extended bridge 100 ends.

Figure 7:
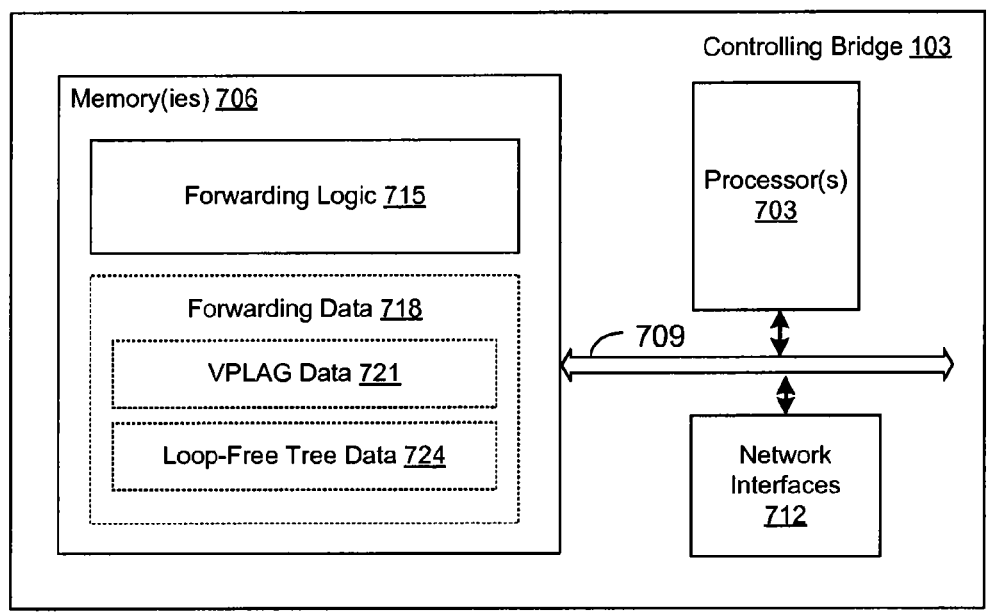
FIG. 7 shows an exemplary schematic block diagram of an exemplary controlling bridge employed in the exemplary extended bridge of FIG. 1 according to various embodiments of the present disclosure.

FIG. 7 shows an exemplary schematic block diagram of the controlling bridge 103 employed in the exemplary extended bridge 100 (FIGS. 1 & 3) according to various embodiments of the present disclosure. The controlling bridge 103 includes at least one processor circuit, for example, having a processor 703 and a memory 706, both of which are coupled to a local interface 709. To this end, the controlling bridge 103 may comprise, for example, a network gateway device, a server device, a router, and/or other types of computing devices. The local interface 709 may comprise, for example, a data bus with an accompanying address/control bus or other bus structure as can be appreciated. One or more network interfaces 712 may be coupled to the local interface 709.

Stored in the memory 706 are both data and several components that are executable by the processor 703. In particular, stored in the memory 706 and executable by the processor 703 is forwarding logic 715 and potentially other logic. Also stored in the memory 706 may be forwarding data 718 and other data. The forwarding data 718 may comprise VPLAG data 721, loop-free tree data 724, and other data. In addition, an operating system may be stored in the memory 706 and executable by the processor 703.

One or more software components may be stored in the memory 706 and may be executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6A and 6B shows the functionality and operation of an implementation of portions of the controlling bridge 103, the port extenders 109 (FIG. 1), and the extended bridge 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 6A and 6B show a specific order of execution, it is understood that the order of execution may differ from that which is depicted. For example, the order of execution of two or more blocks may be scrambled relative to the order shown. Also, two or more blocks shown in succession in FIGS. 6A and 6B may be executed concurrently or with partial concurrence. Further, in some embodiments, one or more of the blocks shown in FIGS. 6A and 6B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. In some embodiments, the computer-readable medium may comprise transitory propagation media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A bridge device, comprising:
an ingress port;
an egress port; and
processing circuitry configured to
receive a packet via the ingress port;
determine a destination virtual port link aggregation group according to a destination media access control (MAC) address of an end station identified in the packet;
determine an egress virtual port of the destination virtual port link aggregation group, a destination virtual port of a destination port extender being reachable through the egress virtual port and the destination port extender reachable through any of a plurality of intermediate port extenders; and
forward the packet through the egress virtual port when a source virtual port link aggregation group is not the destination virtual port link aggregation group.

2. The bridge device according to claim 1, wherein the forwarded packet includes an identifier that identifies the destination virtual port.

3. The bridge device according to claim 1, wherein
the packet includes a source identifier of the source virtual port link aggregation group, and
the source virtual port link aggregation group corresponds to an extended port.

4. The bridge device according to claim 1, wherein
the packet is received, via the ingress port, from a first intermediate port extender of the plurality of intermediate port extenders, and
the processing circuitry is further configured to receive another packet from the first intermediate port extender via the ingress port, the other received packet including a second identifier that identifies a different source virtual port of a different source port extender.

5. The bridge device according to claim 2, wherein the packet is forwarded to a first intermediate port extender of the plurality of intermediate port extenders, the first intermediate port extender being configured to forward the packet to the destination port extender based at least in part on the identifier of the destination virtual port.

6. The bridge device according to claim 1, wherein the packet is forwarded to the destination port extender having the destination virtual port.

7. The bridge device according to claim 1, wherein the packet further includes a selection identifier that identifies the selected one of the plurality of egress virtual ports.

8. The bridge device according to claim 1, wherein the packet further includes a source identifier that identifies the source virtual port link aggregation group.

9. The bridge device according to claim 1, wherein the processing circuitry is further configured to embed the identifier in the packet when the destination MAC address corresponds to a multicast group.

10. A method, comprising:
receiving a packet via an ingress port;
determining, by processing circuitry, a destination virtual port link aggregation group according to a destination media access control (MAC) address of an end station identified in the packet;
determining, by the processing circuitry, an egress virtual port of the destination virtual port link aggregation group, a destination virtual port of a destination port extender being reachable through the egress virtual port and the destination port extender reachable through any of a plurality of intermediate port extenders; and
forwarding the packet through the egress virtual port when a source virtual port link aggregation group is not the destination virtual port link aggregation group.

11. The method according to claim 10, wherein the forwarded packet includes an identifier that identifies the destination virtual port.

12. The method according to claim 10, wherein
the packet includes a source identifier of the source virtual port link aggregation group, and
the source virtual port link aggregation group corresponds to an extended port.

13. The method according to claim 10, wherein
the packet is received, via the ingress port, from a first intermediate port extender of the plurality of intermediate port extenders, and
the method further comprises receiving another packet from the first intermediate port extender via the ingress port, the other received packet including a second identifier that identifies a different source virtual port of a different source port extender.

14. The method according to claim 11, wherein the packet is forwarded to a first intermediate port extender of the plurality of intermediate port extenders, the first intermediate port extender being configured to forward the packet to the destination port extender based at least in part on the identifier of the destination virtual port.

15. The method according to claim 10, wherein the packet is forwarded to the destination port extender having the destination virtual port.

16. The method according to claim 10, wherein the packet further includes a selection identifier that identifies the selected one of the plurality of egress virtual ports.

17. The method according to claim 10, wherein the packet further includes a source identifier that identifies the source virtual port link aggregation group.

18. The method according to claim 10, further comprising embedding, by the processing circuitry, the identifier in the packet when the destination MAC address corresponds to a multicast group.

19. The method according to claim 10, further comprising dropping the packet when the source virtual port link aggregation group is the destination virtual port link aggregation group.

20. A non-transitory computer readable medium that stores computer executable instructions that, when executed by processing circuitry of a bridge device, cause the bridge device to:
receive a packet via an ingress port;
determine a destination virtual port link aggregation group according to a destination media access control (MAC) address of an end station identified in the packet;
determine an egress virtual port of the destination virtual port link aggregation group, a destination virtual port of a destination port extender being reachable through the egress virtual port and the destination port extender reachable through any of a plurality of intermediate port extenders; and
forward the packet through the egress virtual port when a source virtual port link aggregation group is not the destination virtual port link aggregation group.

* * * * *